US012555912B2

(12) United States Patent
Ohira et al.

(10) Patent No.: US 12,555,912 B2
(45) Date of Patent: Feb. 17, 2026

(54) ANTENNA MODULE AND COMMUNICATION DEVICE MOUNTED WITH SAME

(71) Applicant: Murata Manufacturing Co., Ltd., Nagaokakyo (JP)

(72) Inventors: Masataka Ohira, Saitama (JP); Kaoru Sudo, Nagaokakyo (JP); Yoshinori Taguchi, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 69 days.

(21) Appl. No.: 18/591,003

(22) Filed: Feb. 29, 2024

(65) Prior Publication Data

US 2024/0204412 A1 Jun. 20, 2024

Related U.S. Application Data

(63) Continuation of application No. PCT/JP2022/029670, filed on Aug. 2, 2022.

(30) Foreign Application Priority Data

Aug. 30, 2021 (JP) ................................ 2021-139853

(51) Int. Cl.
*H01Q 9/04* (2006.01)
*H01Q 1/24* (2006.01)
(Continued)

(52) U.S. Cl.
CPC ........... *H01Q 9/0442* (2013.01); *H01Q 1/243* (2013.01); *H01Q 23/00* (2013.01); *H01P 1/20* (2013.01)

(58) Field of Classification Search
CPC .... H01Q 1/2283; H01Q 1/243; H01Q 9/0435; H01Q 9/0442; H01Q 21/065; H01Q 23/00
See application file for complete search history.

(56) References Cited

U.S. PATENT DOCUMENTS

2018/0048069 A1 2/2018 Panther et al.
2020/0161767 A1* 5/2020 Hara .................... H01Q 9/0414

FOREIGN PATENT DOCUMENTS

JP S54-20638 A 2/1979
JP 2001-267825 A 9/2001
(Continued)

OTHER PUBLICATIONS

International Search Report and Written Opinion mailed on Nov. 1, 2022, received for PCT Application PCT/JP2022/029670, filed on Aug. 2, 2022, 12 pages including English Translation.

*Primary Examiner* — Hoang V Nguyen
(74) *Attorney, Agent, or Firm* — XSENSUS LLP

(57) ABSTRACT

An antenna module includes a dielectric substrate, a radiating element that is arranged in the dielectric substrate, ground electrodes that are arranged to be opposed to the radiating element, and a resonance circuit. The resonance circuit is arranged between the radiating element and the ground electrode and includes resonators. The radiating element and the resonance circuit constitute a filter device. The resonance circuit includes an input line that receives a radio frequency signal from an RFIC, a resonance portion that is coupled with the input line, and a resonance portion that is coupled with the input line and the radiating element. The ground electrode is arranged between the radiating element and the input line. The resonance portion functions as an extracted pole unit. The input line is arranged between the resonance portion and the resonance portion.

20 Claims, 8 Drawing Sheets

(51) Int. Cl.

| | |
|---|---|
| ***H01Q 23/00*** | (2006.01) |
| *H01P 1/20* | (2006.01) |

(56) References Cited

FOREIGN PATENT DOCUMENTS

| | | | | |
|---|---|---|---|---|
| JP | 2003-258547 | A | 9/2003 | |
| JP | 2020-088493 | A | 6/2020 | |
| WO | WO-2020240998 | A1 * | 12/2020 | ............ H01Q 23/00 |
| WO | 2021/095301 | A1 | 5/2021 | |

* cited by examiner

ANTENNA MODULE AND COMMUNICATION DEVICE MOUNTED WITH SAME

CROSS-REFERENCE TO RELATED APPLICATIONS

This is a continuation application of PCT/JP2022/029670, filed on Aug. 2, 2022, designating the United States of America, which is based on and claims priority to Japanese Patent Application No. JP 2021-139853 filed on Aug. 30, 2021. The entire contents of the above-identified applications, including the specifications, drawings and claims, are incorporated herein by reference in their entirety.

TECHNICAL FIELD

The present disclosure relates to an antenna module and a communication device mounted with the same, and more specifically relates to a structure of an antenna module with built-in filter.

BACKGROUND ART

Japanese Unexamined Patent Application Publication No. 2001-267825 (Patent Document 1) and Japanese Unexamined Patent Application Publication No. 2003-258547 (Patent Document 2) disclose an antenna device that includes a filter, which is integrally formed with an antenna in a dielectric substrate, and uses a radiating element of the antenna as a resonator of the filter. The configurations of Patent Documents 1 and 2 enable miniaturization of the antenna devices and improvement of antenna characteristics.

CITATION LIST

Patent Documents

Patent Document 1: Japanese Unexamined Patent Application Publication No. 2001-267825
Patent Document 2: Japanese Unexamined Patent Application Publication No. 2003-258547

SUMMARY OF DISCLOSURE

Technical Problem

In recent years, a configuration has been proposed in which an antenna device and a filter are integrated in a front-end circuit of wireless communication devices such as smartphones or cellular phones. There is still a strong demand for miniaturization of such wireless communication devices, and along with this, there is also a need for miniaturization of a front-end circuit itself. In particular, in so-called dual polarization type antenna devices that can radiate radio waves in two different polarization directions, a filter should be arranged for each polarization and accordingly, the filter itself also should be miniaturized.

Regarding filter characteristics, it is also desirable to increase attenuation in a non-pass band and to increase steepness in the vicinity of a pass band.

The present disclosure has been made to solve the above problems and an object of the present disclosure is to realize miniaturization of an antenna module in which a filter device is incorporated and improvement of filter characteristics.

Solution to Problem

An antenna module according to an aspect of the present disclosure includes: a dielectric substrate; a radiating element that is arranged in the dielectric substrate; a first ground electrode and a second ground electrode that are arranged to be opposed to the radiating element; and a resonance circuit. The resonance circuit is arranged between the radiating element and the first ground electrode and includes a plurality of resonators. The radiating element and the resonance circuit constitute a filter device. The resonance circuit includes: an input line that receives a radio frequency signal from a feed circuit; a first resonance portion that is coupled with the input line; and a second resonance portion that is coupled with the input line and the radiating element. A second ground electrode is arranged between the radiating element and the input line. The first resonance portion functions as an extracted pole unit (EPU) generating an attenuation pole in an outside of a pass band of the filter device. The input line is arranged between the first resonance portion and the second resonance portion.

An antenna module according to another aspect of the present disclosure includes: a dielectric substrate; a radiating element that is arranged in the dielectric substrate; a first ground electrode and a second ground electrode that are arranged to be opposed to the radiating element; a first resonance circuit; and a second resonance circuit. Each of the first resonance circuit and the second resonance circuit includes a plurality of resonators and is arranged between the radiating element and the first ground electrode. The radiating element and the first resonance circuit constitute a first filter device and the radiating element and the second resonance circuit constitute a second filter device. Each of the first resonance circuit and the second resonance circuit includes: an input line that receives a radio frequency signal from a feed circuit; a first resonance portion that is coupled with the input line; and a second resonance portion that is coupled with the input line and the radiating element. A second ground electrode is arranged between the radiating element and the input line of the first resonance circuit and between the radiating element and the input line of the second resonance circuit. The first resonance portion functions as an EPU generating an attenuation pole in an outside of a pass band of a corresponding filter device. The input line is arranged between the first resonance portion and the second resonance portion. The radiating element is capable of radiating a radio wave in a first polarization direction and a second polarization direction, which is different from the first polarization direction. A signal passing through the first resonance circuit is supplied to a feed point for radiating a radio wave of the first polarization direction in the radiating element. A signal passing through the second resonance circuit is supplied to a feed point for radiating a radio wave of the second polarization direction in the radiating element.

Advantageous Effects of Disclosure

The antenna module according to the present disclosure includes the radiating element and the resonance circuit that constitute the filter device. The resonance circuit includes the first resonance portion and the second resonance portion that are branched from the input line, the first resonance portion functions as an EPU, and the second resonance portion is coupled to the radiating element. In the antenna module according to the present disclosure, a pass band can be defined by the radiating element and the second resonance portion with a relatively simple structure and an attenuation pole can be formed in a non-pass band by the first resonance portion. Accordingly, miniaturization and improvement of filter characteristics can be realized in the antenna module in which a filter device is incorporated.

DESCRIPTION OF EMBODIMENTS

Figure 1:
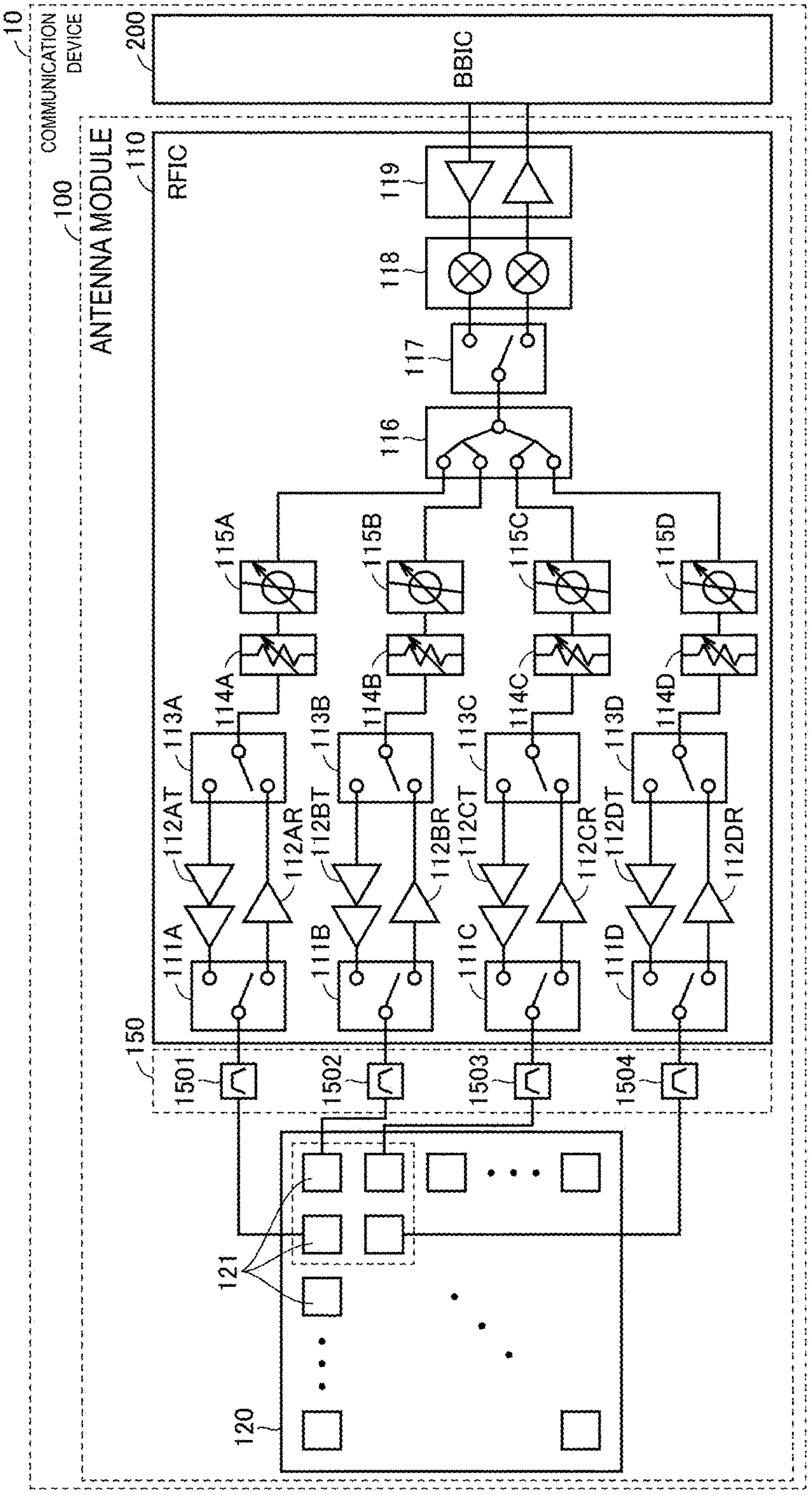
FIG. 1 is a block diagram of a communication device to which an antenna module according to a first embodiment is applied.

Embodiments according to the present disclosure will be described in detail below with reference to the accompanying drawings. Here, the same reference characters are given to the same or corresponding portions and the description thereof will not be repeated.

First Embodiment (Basic Configuration of Communication Device)

FIG. 1 is an example of a block diagram of a communication device 10 to which an antenna module 100 according to this first embodiment is applied. The communication device 10 is, for example, a portable terminal such as a cellular phone, a smartphone, and a tablet, or a personal computer with a communication function. An example of a frequency band of a radio wave used for the antenna module 100 according to the present embodiment is a millimeter wave band with a center frequency of 28 GHz, 39 GHz, or 60 GHz, for example, but radio waves in frequency bands other than the above are also applicable. In the example below, a case where a bandwidth with a center frequency of 28 GHz is a pass band (26.5 GHz to 29.5 GHz) will be explained as an example.

Referring to FIG. 1, the communication device 10 includes the antenna module 100 and a BBIC 200, which constitutes a baseband signal processing circuit. The antenna module 100 includes an RFIC 110, which is an example of a feed circuit, an antenna device 120, and a resonance circuit 150. The communication device 10 up-converts a signal, which is transmitted from the BBIC 200 to the antenna module 100, to a radio frequency signal at the RFIC 110 and radiates the radio frequency signal from the antenna device 120 via the resonance circuit 150. Further, the communication device 10 transmits a radio frequency signal, which is received at the antenna device 120, to the RFIC 110 via the resonance circuit 150 so as to down-convert the radio frequency signal and process the obtained signal at the BBIC 200.

FIG. 1 illustrates the configuration corresponding to four radiating elements 121 and omits the illustration of the same configurations corresponding to other radiating elements 121 among a plurality of radiating elements 121 constituting the antenna device 120, for the sake of simpler description. Here, FIG. 1 illustrates the example in which the antenna device 120 is composed of a plurality of radiating elements 121 arranged in a two-dimensional array. However, the plurality of radiating elements 121 may be aligned in one-dimensional array. Alternatively, the antenna device 120 may be composed of a single radiating element 121. In this first embodiment, the radiating element 121 is a patch antenna having a substantially-square flat-plate shape.

The RFIC 110 includes switches 111A to 111D, 113A to 113D, and 117; power amplifiers 112AT to 112DT; low noise amplifiers 112AR to 112DR; attenuators 114A to 114D; phase shifters 115A to 115D; a signal synthesizer/demultiplexer 116; a mixer 118; and an amplifying circuit 119.

In transmitting a radio frequency signal, the switches 111A to 111D and 113A to 113D are switched to the power amplifiers 112AT to 112DT sides and the switch 117 is connected to a transmission amplifier of the amplifying circuit 119. In receiving a radio frequency signal, the switches 111A to 111D and 113A to 113D are switched to the low noise amplifiers 112AR to 112DR sides and the switch 117 is connected to a reception amplifier of the amplifying circuit 119.

A signal transmitted from the BBIC 200 is amplified in the amplifying circuit 119 and up-converted in the mixer 118. A transmission signal that is the up-converted radio frequency signal is demultiplexed into four signals in the signal synthesizer/demultiplexer 116 and fed to respective mutually-different radiating elements 121 through four respective signal paths. At this time, the directivity of the antenna device 120 can be adjusted by individually adjusting phase levels of the phase shifters 115A to 115D arranged on respective signal paths.

Reception signals which are radio frequency signals received by respective radiating elements 121 pass through four respective different signal paths and synthesized in the signal synthesizer/demultiplexer 116. The synthesized reception signal is down-converted in the mixer 118 and amplified in the amplifying circuit 119 to be transmitted to the BBIC 200.

The resonance circuit 150 includes resonance circuits 1501 to 1504. The resonance circuits 1501 to 1504 are connected to the switches 111A to 111D in the RFIC 110 respectively. Each of the resonance circuits 1501 to 1504 and a corresponding radiating element 121 constitute a filter device to have a function to attenuate a signal in a specific frequency band. The filter devices constituted by the resonance circuits 1501 to 1504 and respective radiating elements 121 may be a band pass filter, a high pass filter, a low pass filter, or a combination of these. Radio frequency signals from the RFIC 110 pass through the resonance circuits 1501 to 1504 to be supplied to the corresponding radiating elements 121.

For radio frequency signals in the millimeter wave band, more noise components tend to be introduced as a transmission line is elongated. Therefore, it is preferable to decrease a distance between the resonance circuit 150 and the radiating element 121 as short as possible. Namely, it is possible to suppress radiation of an unwanted wave from the radiating element 121 by allowing a radio frequency signal to pass through the resonance circuit 150 immediately before radiating the radio frequency signal from the radiating element 121. Further, an unwanted wave included in a reception signal can be removed by allowing the reception signal to pass through the resonance circuit 150 immediately after receiving the reception signal at the radiating element 121.

Here, FIG. 1 separately illustrates the resonance circuit 150 and the antenna device 120, but the resonance circuit 150 is arranged in the antenna device 120 as described later in the present disclosure.

The RFIC 110 is one chip of integrated circuit component having the above-described circuit configuration, for example. Alternatively, devices (switch, power amplifier, low noise amplifier, attenuator, phase shifter) corresponding to each radiating element 121 in the RFIC 110 may be provided as one chip of integrated circuit component for each corresponding radiating element 121.

(Configuration of Antenna Module)

Figure 2:
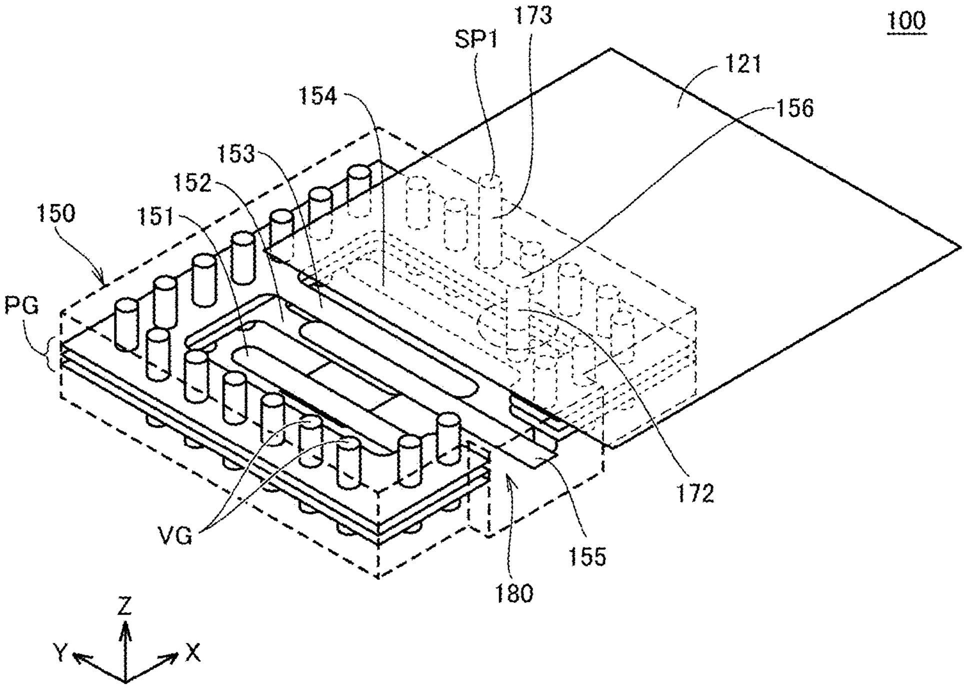
FIG. 2 is a perspective view of the antenna module according to the first embodiment.
Figure 3:
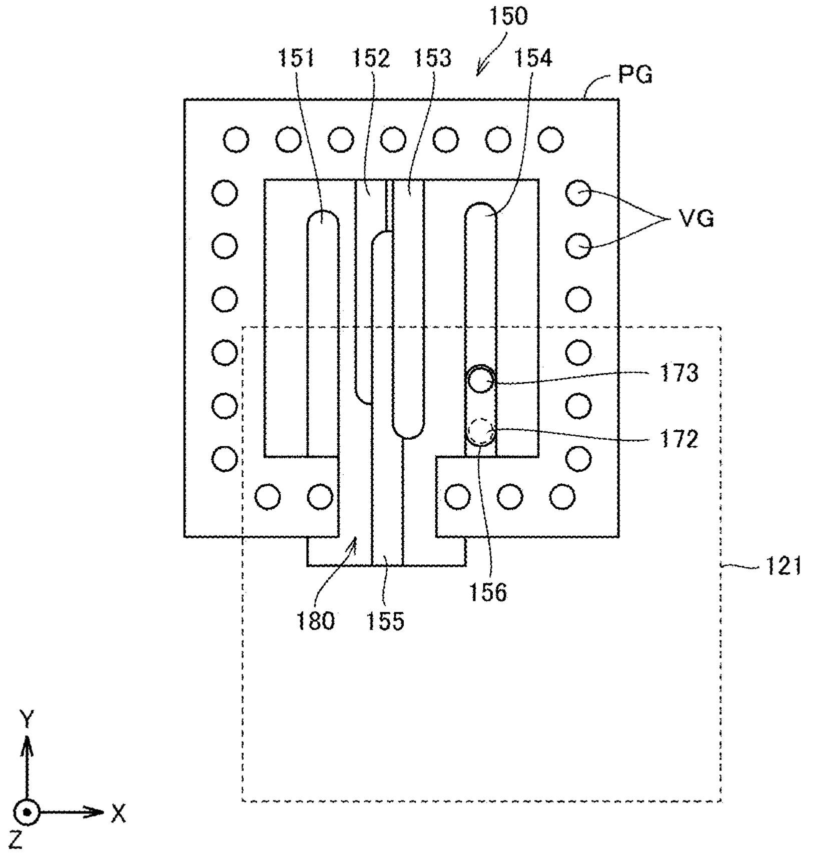
FIG. 3 is a plan view of part of a resonance circuit in the antenna module.
Figure 4:
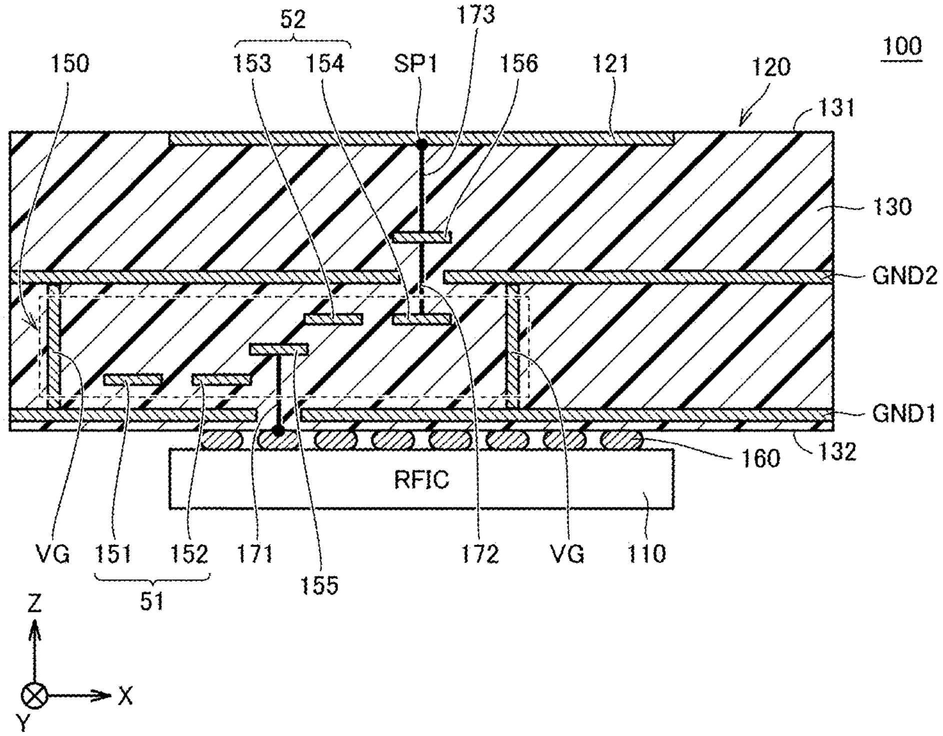
FIG. 4 is a side perspective view of the antenna module according to the first embodiment.

The configuration of the antenna module 100 according to this first embodiment will now be described in detail with reference to FIGS. 2 to 4. FIG. 2 is a perspective view of the antenna module 100. FIG. 3 is a plan view of part of the resonance circuit 150 in the antenna module 100. FIG. 4 is a side perspective view of the antenna module 100. Here, FIGS. 2 and 3 omit illustration of a dielectric substrate 130 and the RFIC 110, for the sake of simpler description.

An example in which the antenna module 100 includes one radiating element 121 will be described with reference to FIGS. 2 to 4. However, the antenna module 100 may be an array antenna in which a plurality of radiating elements are one-dimensionally or two-dimensionally arrayed, as described in FIG. 1.

Referring to FIGS. 2 to 4, the antenna module 100 includes the dielectric substrate 130, vias 171 to 173, which are pieces of feed wiring, and ground electrodes GND1 and GND2, in addition to the radiating element 121, the resonance circuit 150, and the RFIC 110. In the following description, a normal direction of the dielectric substrate 130 (a direction of radio wave radiation) is defined as a Z-axis direction, and planes orthogonal to the Z-axis direction are defined by an X axis and a Y axis. Further, a positive direction of the Z axis in each drawing may be referred to as an upper side and a negative direction of the same may be referred to as a lower side. The Z-axis direction corresponds to a "first direction" in the present disclosure.

The dielectric substrate 130 is, for example, a low temperature co-fired ceramics (LTCC) multi-layer substrate; a multi-layer resin substrate, which is formed by laminating a plurality of resin layers made of resin such as epoxy or polyimide; a multi-layer resin substrate, which is formed by laminating a plurality of resin layers made of liquid crystal polymer (LCP) having a lower dielectric constant; a multi-layer resin substrate, which is formed by laminating a plurality of resin layers made of fluorine resin; or a multi-layer substrate made of ceramics other than LTCC. Here, the dielectric substrate 130 does not necessarily have to have a multi-layer structure but may be a single-layer substrate.

The dielectric substrate 130 has a substantially rectangular parallelepiped shape, and the radiating element 121 is arranged on an upper surface 131 (a surface in the positive direction of the Z axis) of the dielectric substrate 130 or in a dielectric layer which is in the inside and close to the upper surface 131. The ground electrode GND1 having a flat-plate shape is arranged over the entire surface of a dielectric layer which is in the inside and close to a lower surface 132 (a surface in the negative direction of the Z axis) of the dielectric substrate 130 in a manner to be opposed to the radiating element 121. Further, the ground electrode GND2 having a flat-plate shape is arranged in a dielectric layer between the radiating element 121 and the ground electrode GND1, in a manner to be opposed to the radiating element 121. The ground electrode GND2 and the radiating element 121 constitute an antenna.

On the lower surface 132 of the dielectric substrate 130, the RFIC 110 is mounted with solder bumps 160 interposed therebetween. However, the RFIC 110 may be connected to the dielectric substrate 130 with a multipole connector instead of solder connection.

The resonance circuit 150 is arranged in a wiring layer between the ground electrode GND1 and the ground electrode GND2. The resonance circuit 150 includes an input line 155 and resonators 151 to 154. As illustrated in FIG. 2 or FIG. 3, the input line 155 and the resonators 151 to 154 are belt-like flat-plate electrodes, which extend in the Y-axis direction. When a wavelength of a signal corresponding to a center frequency of the pass band of the filter device, which is composed of the resonance circuit 150 and the radiating element 121, is denoted as λ, the resonators 151 to 154 have the length of λ/4. That is, the resonators 151 to 154 are λ/4 resonators.

In the resonance circuit 150, a plurality of vias VG are arranged in a manner to surround the resonators 151 to 154. The vias VG are connected with the ground electrodes GND1 and GND2. The resonance circuit 150 further includes a flat-plate electrode PG, which has a substantially C shape and connects the vias VG with each other. One end of each of the resonators 151 to 154 is connected to the flat-plate electrode PG. The input line 155 extends into the resonance circuit 150 through a cutout portion 180 of the flat-plate electrode PG. The vias VG and the flat-plate electrode PG function as shields and suppress electromagnetic field coupling of the resonators 151 to 154 and the input line 155 with other pieces of wiring arranged in the wiring layer.

Regarding the input line 155, a radio frequency signal is transmitted from the RFIC 110 to the input line 155 by the solder bumps 160 connected to the RFIC 110 with the via 171 interposed therebetween.

The resonators 151 and 152 are arranged in a dielectric layer between the dielectric layer, in which the input line 155 is arranged, and the dielectric layer, in which the ground electrode GND1 is arranged. The resonator 152 is arranged on a position closer to the input line 155 than the resonator 151, and part of the resonator 152 overlaps with the input line 155 in plan view in the normal direction of the dielectric substrate 130. The resonator 152 is electromagnetically coupled with the resonator 151 and the input line 155. The resonators 151 and 152 constitute a resonance portion 51 functioning as an EPU, which generates an attenuation pole. The resonators 151 and 152 are thus added other than a series path with which a signal passes through the filter device, being able to provide an attenuation pole in a non-pass band on the higher frequency side and/or the lower frequency side than the pass band of the filter device. Here, the resonators 151 and 152 do not necessarily have to be arranged in the same dielectric layer as long as the resonators 151 and 152 can be electromagnetically coupled with each other.

The resonators 153 and 154 are arranged in a dielectric layer between the dielectric layer, in which the input line 155 is arranged, and the dielectric layer, in which the ground electrode GND2 is arranged. The resonator 153 is arranged on a position closer to the input line 155 than the resonator 154, and part of the resonator 153 overlaps with the input line 155 in plan view in the normal direction of the dielectric substrate 130. The resonator 153 is electromagnetically coupled with the resonator 154 and the input line 155. The resonator 154 is connected with a feed point SP1 of the radiating element 121 via the vias 172 and 173 and a flat-plate electrode 156. The feed point SP1 is arranged at a position offset from the center of the radiating element 121 in the positive direction of the Y axis. When a radio frequency signal is supplied to the feed point SP1, a radio wave whose polarization direction is in the Y-axis direction is radiated from the radiating element 121.

The resonators 153 and 154 constitute a resonance portion 52. The pass band of the filter device is defined by the input line 155, the resonators 153 and 154, and the radiating element 121. When the resonance portion 52 is arranged at a position closer to the radiating element 121 than the resonance portion 51, feed wiring connecting the resonator 154 with the radiating element 121 can be shortened, being able to reduce a transmission loss. Here, the resonators 153 and 154 do not necessarily have to be arranged in the same dielectric layer as long as the resonators 153 and 154 can be electromagnetically coupled with each other.

As described, the resonance portion 51, which is composed of the resonators 151 and 152, and the resonance portion 52, which is composed of the resonators 153 and 154, are arranged at positions in mutually opposite directions with respect to the input line 155. Thus, the resonance portion 51 and the resonance portion 52 are not directly coupled with each other.

Figure 5:
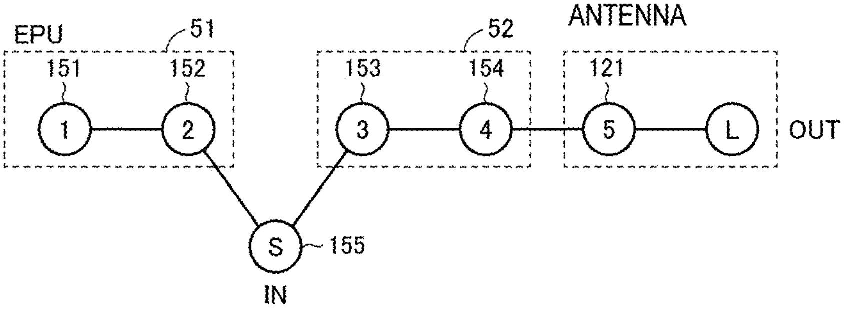
FIG. 5 is a diagram for explaining a configuration of a filter device.

FIG. 5 is a diagram for explaining a filter device 50 composed of the resonance circuit 150 and the radiating element 121. FIG. 5 illustrates a coupling state between each corresponding nodes constituting the filter device 50. In FIG. 5, a node "S" corresponds to the input line 155 and nodes "1" to "4" correspond to the resonators 151 to 154 respectively. A node "5" corresponds to the radiating element 121. Here, a node "L" corresponds to a space to which a radio wave is radiated. As illustrated in FIG. 5, the input line 155 is electromagnetically coupled with the resonator 152 of the resonance portion 51 and the resonator 152 is electromagnetically coupled with the resonator 151. Further, the input line 155 is electromagnetically coupled with the resonator 153 of the resonance portion 52, the resonator 153 is electromagnetically coupled with the resonator 154, and the resonator 154 is connected to the radiating element 121. In the filter device 50 configured in the antenna module 100 according to the first embodiment, the resonance portion 51 for forming an attenuation pole is not coupled with the resonance portion 52 and the radiating element 121, which set a pass band, but is a path branched from the input line 155.

Generally, in a filter device composed of a plurality of resonators, a configuration for forming a skip-over coupling among resonators is known as a method for providing an attenuation pole in a non-pass band. In this configuration, a structure is required in which a certain resonator in the filter device skips over one or more adjacent resonators to be coupled with another resonator. Accordingly, the shapes and arrangement of the resonators are complicated and the overall size of the filter device is sometimes increased.

On the other hand, the resonance portion 51 functioning as an EPU is provided in the filter device 50 configured in the antenna module 100 according to the first embodiment, being able to provide an attenuation pole in a non-pass band without using skip-over coupling. Skip-over coupling is not required and therefore, the filter device can be configured with a relatively simple structure, in which λ/4 resonators which are belt-like flat-plate electrodes are arranged adjacent to each other as respective resonators. Thus, for the filter device 50 according to the first embodiment, the overall size of the filter device can be reduced compared to a filter device employing skip-over coupling, and attenuation characteristics of the filter device 50 can be improved by providing an attenuation pole in a non-pass band with an EPU.

(Antenna Characteristics)

Figure 6:
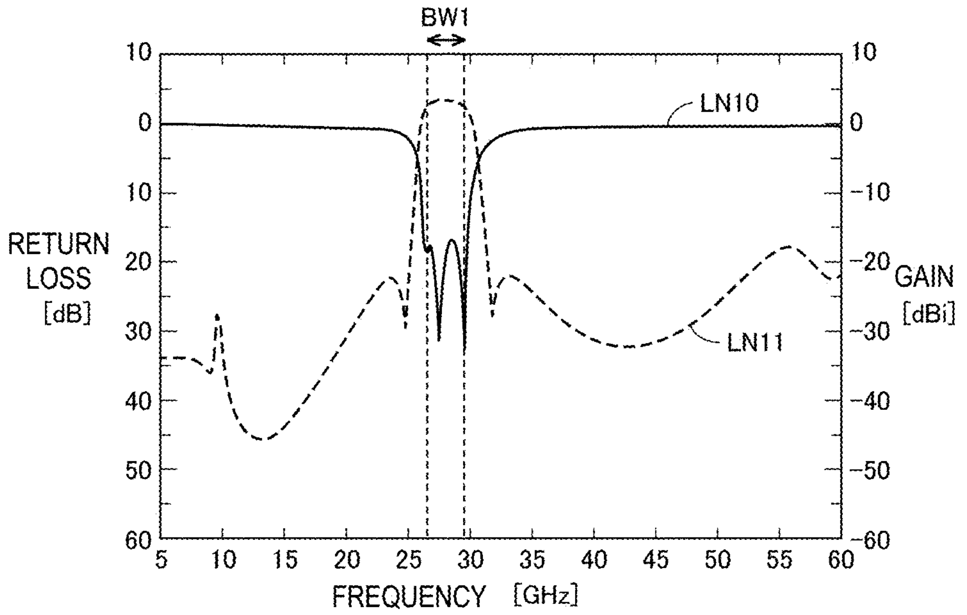
FIG. 6 is a diagram for explaining antenna characteristics according to the first embodiment.

FIG. 6 is a diagram for explaining antenna characteristics according to the first embodiment. In FIG. 6, the horizontal axis indicates frequency, and the vertical axes indicate return loss (the left axis) and antenna gain (the right axis). In FIG. 6, a solid line LN10 indicates return loss and a dashed line LN11 indicates antenna gain.

Referring to FIG. 6, as for return loss, return loss of approximately 20 dB is able to be realized in a target pass band BW1 of 28 GHz band (26.5 GHz to 29.5 GHz). As for antenna gain, 0 dBi or greater gain is able to be realized in the pass band BW1. Further, in a non-pass band, attenuation poles are formed near 25 GHz and near 32 GHz and steep attenuation is realized in the vicinity of the pass band.

As described above, the antenna module 100 according to the first embodiment includes the filter device 50 that has the resonance portions 51 and 52, which are branched from the input line 155, an attenuation pole is formed by the resonance portion 51, and a pass band is formed by the resonance portion 52 and the radiating element 121. The antenna module 100 allows the resonance portion 51 to function as an EPU and thus, a relatively simple structure free from employing the skip-over coupling can be achieved. Accordingly, desired attenuation characteristics can be realized by forming an attenuation pole and the size of the filter device 50 can be reduced at the same time.

The "ground electrodes GND1 and GND2" in the first embodiment correspond to a "first ground electrode" and a "second ground electrode" in the present disclosure respectively. The "resonance portions 51 and 52" in the first embodiment correspond to a "first resonance portion" and a "second resonance portion" in the present disclosure respectively. The "resonators 151 to 154" in the first embodiment correspond to a "first resonator", a "second resonator", a "third resonator", and a "fourth resonator" in the present disclosure respectively. The "vias 172 and 173" in the first embodiment both correspond to a "second via" in the present disclosure. The "via VG" in the first embodiment corresponds to a "third via" in the present disclosure.

First Modification

A first modification will describe a configuration obtained by adding a configuration for adjusting a coupling amount between resonators in the resonance portion 51.

Figure 7:
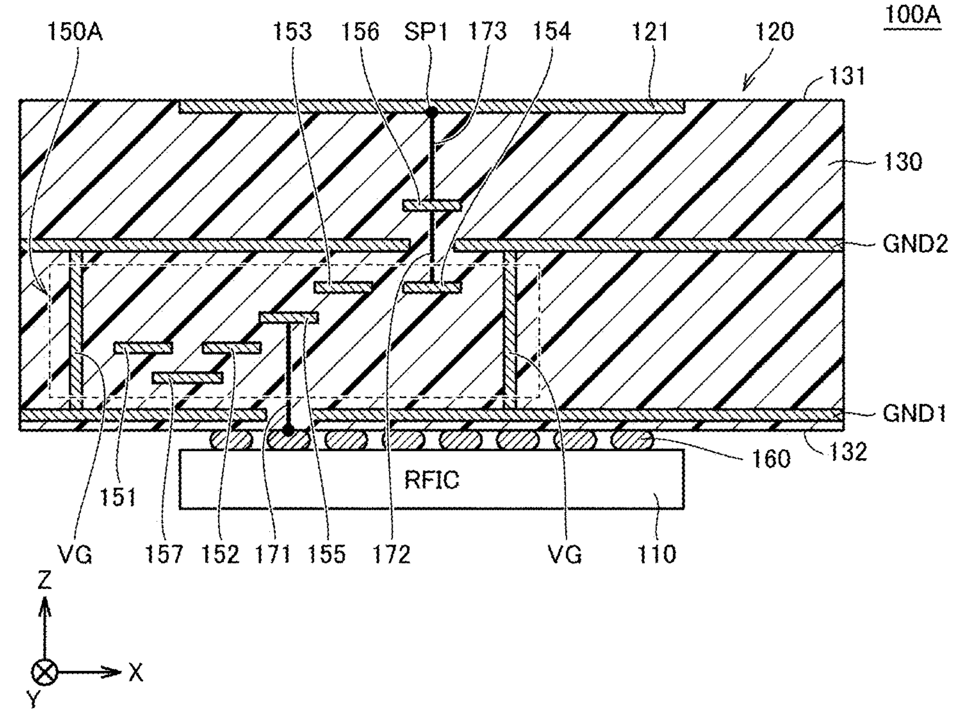
FIG. 7 is a diagram for explaining an antenna module according to a first modification.

FIG. 7 is a diagram for explaining an antenna module 100A according to the first modification. The antenna module 100A has a configuration obtained by replacing the resonance circuit 150 of the antenna module 100 according to the first embodiment with a resonance circuit 150A. For the antenna module 100A, description of elements duplicated in the antenna module 100 of the first embodiment will not be repeated.

Referring to FIG. 7, the resonance circuit 150A of the antenna module 100A has a configuration in which an adjustment element 157 is further arranged in addition to the configuration of the resonance circuit 150. The adjustment element 157 is arranged in a dielectric layer between the dielectric layer, in which the resonators 151 and 152 of the resonance portion 51 are arranged, and the dielectric layer, in which the ground electrode GND1 is arranged. The adjustment element 157 has a substantially rectangular shape and partially overlaps with both of the resonator 151 and the resonator 152 in plan view in the normal direction of the dielectric substrate 130. By adjusting an area, in which the resonators 151 and 152 overlap with the adjustment element 157, and/or distance from the resonators 151 and 152 to the adjustment element 157 (that is, a dielectric layer to be arranged therein), the coupling amount between the resonator 151 and the resonator 152 can be adjusted.

With the addition of such an adjustment element, design parameters are increased in design of a filter device. Therefore, characteristics are further improved by appropriately adjusting the coupling amount.

The "adjustment element 157" in the first modification corresponds to a "third adjustment element" in the present disclosure.

Second Modification

A second modification will describe a configuration in which the resonance portions 51 and 52 and the input line 155 are arranged in the same dielectric layer.

Figure 8:
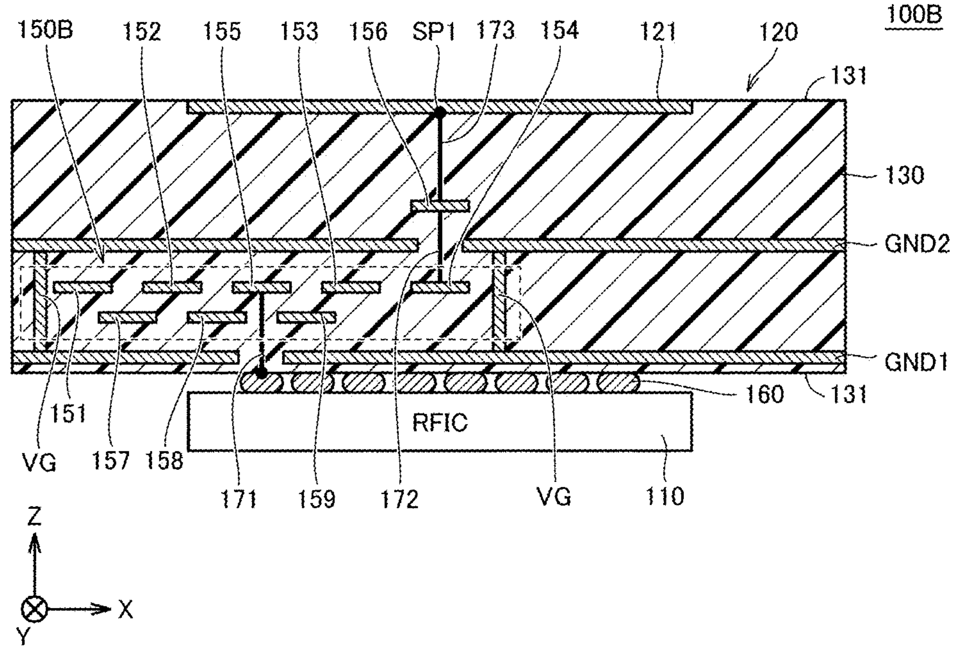
FIG. 8 is a diagram for explaining an antenna module according to a second modification.

FIG. 8 is a diagram for explaining an antenna module 100B according to the second modification. The antenna module 100B has a configuration obtained by replacing the resonance circuit 150 of the antenna module 100 according to the first embodiment with a resonance circuit 150B. For the antenna module 100B, description of elements duplicated in the antenna module 100 of the first embodiment will not be repeated.

Referring to FIG. 8, in the resonance circuit 150B of the antenna module 100B, the resonators 151 and 152, which are included in the resonance portion 51, the input line 155, and the resonators 153 and 154, which are included in the resonance portion 52, are arranged in the same dielectric layer in this order. In other words, the resonance portions 51 and 52 and the input line 155 are arranged adjacent to each other at the same distance from the ground electrode GND1 in the Z-axis direction, and the input line 155 is arranged between the resonance portion 51 and the resonance portion 52 in plan view in the normal direction of the dielectric substrate 130.

In addition, the resonance circuit 150B is further provided with the adjustment element 157 for adjusting the coupling amount between the resonator 151 and the resonator 152, an adjustment element 158 for adjusting the coupling amount between the input line 155 and the resonator 152, and an adjustment element 159 for adjusting the coupling amount between the input line 155 and the resonator 153.

The adjustment elements 157, 158, and 159 are arranged in a dielectric layer between the dielectric layer, in which the resonance portions 51 and 52 and the input line 155 are arranged, and the dielectric layer, in which the ground electrode GND1 is arranged. Here, part or all of the adjustment elements 157, 158, and 159 may be arranged in a dielectric layer between the dielectric layer, in which the resonance portions 51 and 52 and the input line 155 are arranged, and the dielectric layer, in which the ground electrode GND2 is arranged.

The adjustment element 157 has a substantially rectangular shape and partially overlaps with the resonator 151 and the resonator 152 in plan view in the normal direction of the dielectric substrate 130. By adjusting an area, in which each resonator overlaps with the adjustment element 157, and/or distance between each resonator and the adjustment element 157, the coupling amount between the resonator 151 and the resonator 152 can be adjusted.

The adjustment element 158 has a substantially rectangular shape and partially overlaps with the resonator 152 and the input line 155 in plan view in the normal direction of the dielectric substrate 130. By adjusting an area, in which the resonator 152 and the input line 155 overlap with the adjustment element 158, and/or distance from the resonator 152 and the input line 155 to the adjustment element 158, the coupling amount between the resonator 152 and the input line 155 can be adjusted.

The adjustment element 159 has a substantially rectangular shape and partially overlaps with the resonator 153 and the input line 155 in plan view in the normal direction of the dielectric substrate 130. By adjusting an area, in which the resonator 153 and the input line 155 overlap with the adjustment element 159, and/or distance from the resonator 153 and the input line 155 to the adjustment element 159, the coupling amount between the resonator 153 and the input line 155 can be adjusted.

Not shown in FIG. 8, an adjustment element for adjusting the coupling amount between the resonator 153 and the resonator 154 in the resonance portion 52 may further be provided.

Each resonance portion and the input line are thus arranged in the same dielectric layer and accordingly, the dimension in the Z-axis direction of the resonance circuit can be reduced, being able to realize low-profile antenna module. Further, with the addition of the adjustment elements, the coupling amount between the resonators of each resonance portion and the coupling amount between each resonance portion and the input line can be adjusted. As a result, antenna characteristics can be improved.

The "adjustment element 158", the "adjustment element 159", and the "adjustment element 157" in the second modification correspond to a "first adjustment element", a "second adjustment element", and the "third adjustment element" in the present disclosure respectively.

Third Modification

A third modification will describe another coupling mode between a resonance circuit and a radiating element.

Figure 9:
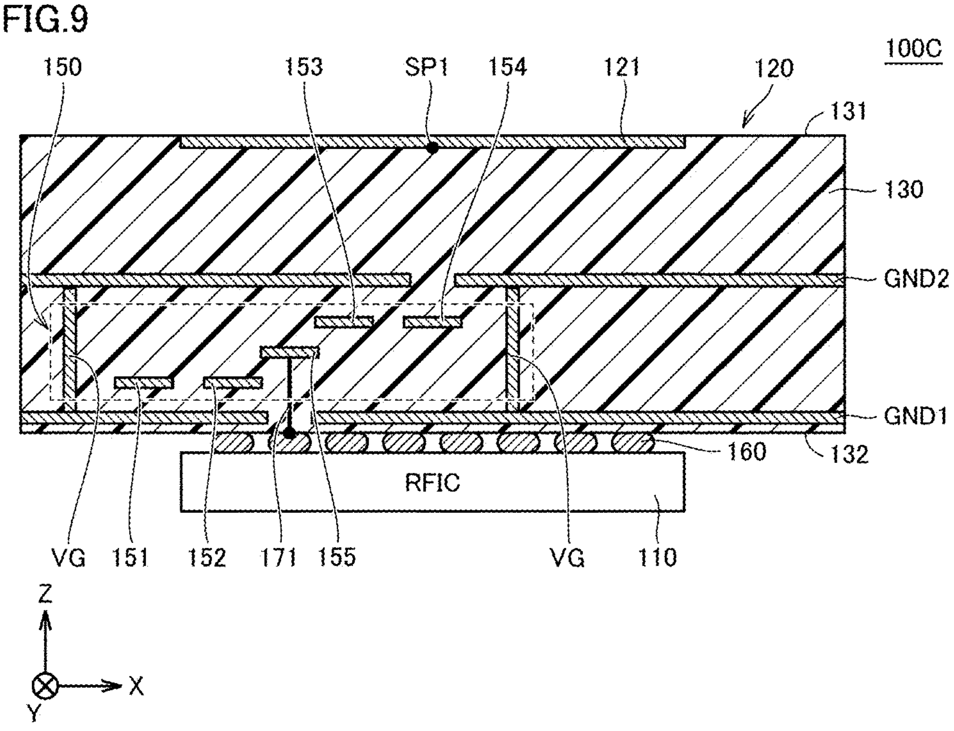
FIG. 9 is a diagram for explaining an antenna module according to a third modification.

FIG. 9 is a diagram for explaining an antenna module 100C according to the third modification. The antenna module 100C has a configuration obtained by removing the vias 172 and 173 and the flat-plate electrode 156, which connect the resonance circuit 150 with the radiating element 121, of the antenna module 100 according to the first embodiment. For the antenna module 100C, description of elements duplicated in the antenna module 100 of the first embodiment will not be repeated.

Referring to FIG. 9, in the antenna module 100C, the resonator 154 on the final stage in the resonance portion 52 is opposed to the feed point SP1 of the radiating element 121 through a cavity, which is formed in the ground electrode GND2. The resonator 154 and the radiating element 121 are capacitively coupled with each other and are configured to transmit a radio frequency signal in a non-contact manner.

In the configuration in which the resonator 154 and the radiating element 121 are directly connected with each other by vias or the like as the antenna module 100 according to the first embodiment, unwanted resonance may occur due to pieces of feed wiring such as the vias and cause noise. By employing the configuration using no feed wiring between the resonator 154 and the radiating element 121 as the antenna module 100C, unwanted resonance caused by the feed wiring can be suppressed and the antenna characteristics can be improved.

Here, in the configuration in which all of the vias 172 and 173 and the flat-plate electrode 156 are removed, coupling between the resonator 154 and the radiating element 121 may be weakened depending on the distance between the resonator 154 and the radiating element 121 and a sufficient antenna gain may be unable to be secured. Therefore, the resonator 154 and the radiating element 121 may be capacitively coupled with each other by employing the configuration in which a part of pieces of feed wiring is removed to the extent that unwanted resonance can be reduced. For example, the flat-plate electrode 156 and the radiating element 121 may be capacitively coupled to each other by employing the configuration in which the via 173 of the antenna module 100 is removed.

Fourth Modification

A fourth modification will describe a configuration in which feed wiring between a resonance circuit and a radiating element is used as part of a resonator on a final stage of the resonance circuit.

Figure 10:
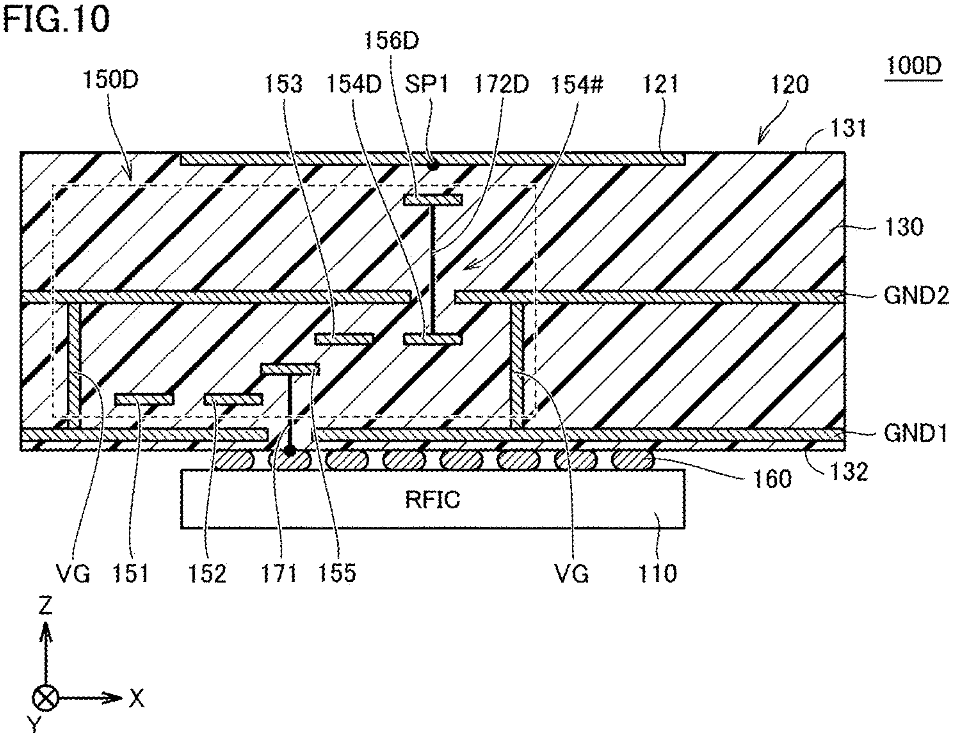
FIG. 10 is a diagram for explaining an antenna module according to a fourth modification.

FIG. 10 is a diagram for explaining an antenna module 100D according to the fourth modification. The antenna module 100D has a configuration obtained by replacing the resonance circuit 150 of the antenna module 100 according to the first embodiment with a resonance circuit 150D. For the antenna module 100D, description of elements duplicated in the antenna module 100 of the first embodiment will not be repeated.

Referring to FIG. 10, in the resonance circuit 150D of the antenna module 100D, the resonator 154 in the resonance portion 52 is replaced with a resonator 154#. The resonator 154# includes flat-plate electrodes 154D and 156D and a via 172D. The flat-plate electrode 154D is arranged adjacent to the resonator 153.

The flat-plate electrode 156D and the via 172D correspond to the flat-plate electrode 156 and the via 172 included in the pieces of feed wiring of the antenna module 100 according to the first embodiment respectively. That is, the flat-plate electrode 156D is arranged in a layer between the dielectric layer, in which the ground electrode GND2 is arranged, and the dielectric layer, in which the radiating element 121 is arranged, and is connected to the flat-plate electrode 154D by the via 172D.

Figure 11:
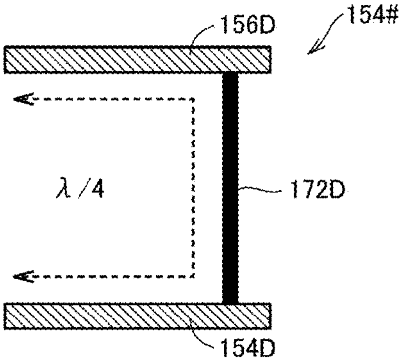
FIG. 11 is a diagram for explaining a configuration of a resonator on a final stage in a resonance circuit according to the fourth modification.

FIG. 11 is a diagram of the resonator 154# in the resonance circuit 150D, viewed in the X-axis direction. The resonator 154# is formed in a substantially C shape by the flat-plate electrodes 154D and 156D and the via 172D, and the length of a path along the flat-plate electrode 154D, the via 172D, and the flat-plate electrode 156D is $\lambda/4$. When the resonator 154# is electromagnetically coupled with the radiating element 121 in a non-contact manner, a radio frequency signal is transmitted from the resonance circuit 150D to the radiating element 121.

In the antenna module 100 according to the first embodiment, the resonator 154 is composed of the flat-plate electrode having the length of $\lambda/4$ and is connected to the radiating element 121 by the pieces of feed wiring (the vias 172 and 173 and the flat-plate electrode 156). In the antenna module 100D, part of the vias and the flat-plate electrode, which are used as the pieces of feed wiring in the above, is used as part of the resonator 154# and accordingly, unwanted resonance caused by the vias can be prevented and the non-contact coupling amount between the resonance circuit 150D and the radiating element 121 can be secured.

The "flat-plate electrodes 154D and 156D" in the fourth modification correspond to a "first flat-plate electrode" and a "second flat-plate electrode" in the present disclosure respectively. The "via 172D" in the fourth modification corresponds to a "first via" in the present disclosure.

Second Embodiment

A second embodiment will describe a configuration in which features of the present disclosure are applied to a so-called dual polarization type antenna module that can radiate radio waves in two different polarization directions from a radiating element.

Figure 12:
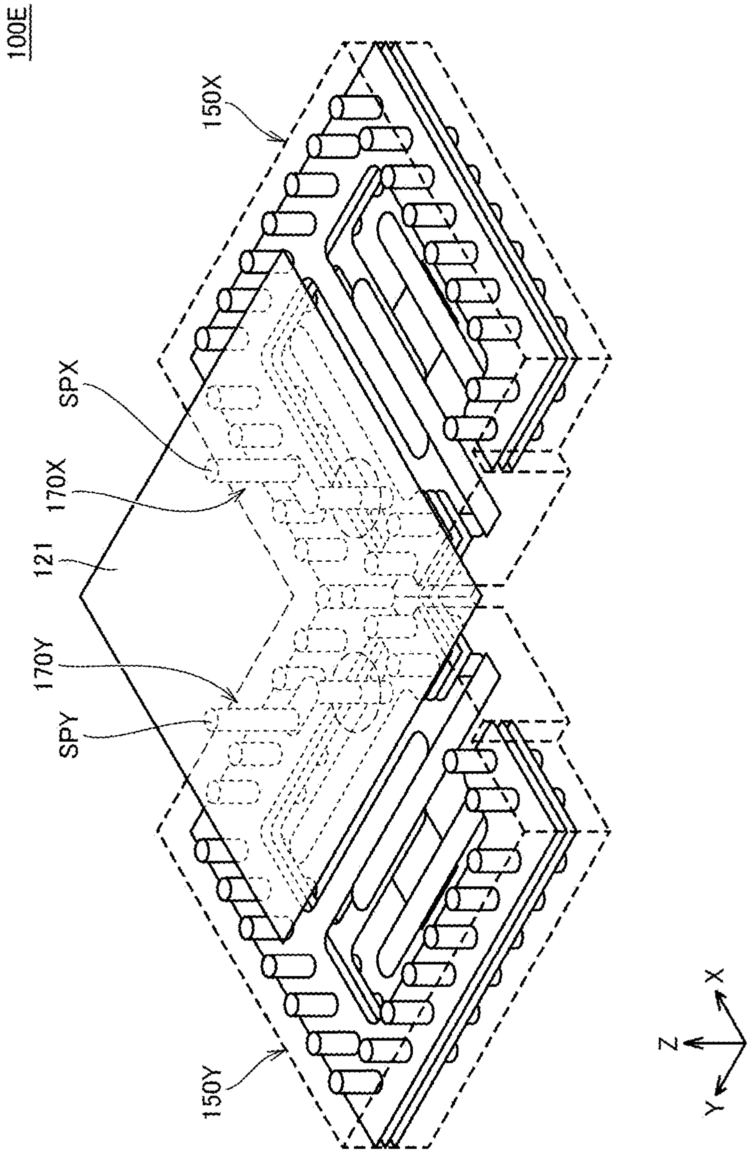
FIG. 12 is a perspective view of an antenna module according to a second embodiment.

FIG. 12 is a perspective view of an antenna module 100E according to the second embodiment. The antenna module 100E has a configuration in which two resonance circuits 150X and 150Y are provided with respect to the radiating element 121. Each of the resonance circuits 150X and 150Y basically has the same configuration as that of the resonance circuit 150 of the antenna module 100 according to the first embodiment. Detailed configurations of the resonance circuits 150X and 150Y are therefore not repeated. Here, in a portion at which the resonance circuits 150X and 150Y overlap with each other, the vias VG, which surround the resonators, and the flat-plate electrode PG are partially shared.

The resonance circuit 150X is connected to a feed point SPX of the radiating element 121 via feed wiring 170X, which is composed of a via and a flat-plate electrode. The feed point SPX is arranged at a position offset from the center of the radiating element 121 in the positive direction of the X axis. By supplying a radio frequency signal to the feed point SPX via the resonance circuit 150X, a radio wave whose polarization direction is in the X-axis direction is radiated from the radiating element. The resonance circuit 150X and the radiating element 121 constitute a filter device for a radio wave whose polarization direction is in the X-axis direction (first filter device).

The resonance circuit 150Y is connected to a feed point SPY of the radiating element 121 via feed wiring 170Y, which is composed of a via and a flat-plate electrode. The feed point SPY is arranged at a position offset from the center of the radiating element 121 in the positive direction of the Y axis. By supplying a radio frequency signal to the feed point SPY via the resonance circuit 150Y, a radio wave whose polarization direction is in the Y-axis direction is radiated from the radiating element. The resonance circuit 150Y and the radiating element 121 constitute a filter device for a radio wave whose polarization direction is in the Y-axis direction (second filter device).

The resonance circuits 150X and 150Y can be configured to have a relatively compact structure as described in the first embodiment. Accordingly, in a dual polarization type antenna module such as the antenna module 100E as well, a resonance circuit can be arranged close to the radiating element 121. As a result, miniaturization of the antenna module and improvement of antenna characteristics can be achieved at the same time.

The configuration of each modification of the first embodiment is applicable to the configuration of the second embodiment to the extent that there is no contradiction.

The "resonance circuits 150X and 150Y" in the second embodiment correspond to a "first resonance circuit" and a "second resonance circuit" in the present disclosure respectively. The "X-axis direction" and the "Y-axis direction" in the second embodiment correspond to a "first polarization direction" and a "second polarization direction" in the present disclosure respectively.

The embodiments disclosed here should be considered exemplary and not restrictive in all respects. The scope of the present disclosure is indicated by the scope of the claims rather than the description of the above-described embodiments, and is intended to include all changes within the scope and meaning equivalent to the scope of the claims.

REFERENCE SIGNS LIST

10 communication device
50 filter device
51, 52 resonance portion
100, 100A to 100E antenna module
110 RFIC
111A to 111D, 113A to 113D, 117 switch
112AR to 112DR low noise amplifier
112AT to 112DT power amplifier
114A to 114D attenuator
115A to 115D phase shifter
116 signal synthesizer/demultiplexer
118 mixer
119 amplifying circuit
120 antenna device
121 radiating element
130 dielectric substrate
131 upper surface
132 lower surface
150, 1501 to 1504, 150A, 150B, 150D, 150X, 150Y resonance circuit
151 to 154, 154# resonator
154D, 156, 156D, PG flat-plate electrode
155 input line
157 to 159 adjustment element
160 solder bump
170X, 170Y feed wiring
171 to 173, 172D, VG via
180 cutout portion
200 BBIC
GND1, GND2 ground electrode
SP1, SPX, SPY feed point

The invention claimed is:

1. An antenna module comprising:
a dielectric substrate;
a radiating element that is arranged in the dielectric substrate;
a first ground electrode that is arranged to be opposed to the radiating element; and
a resonance circuit that is arranged between the radiating element and the first ground electrode and includes a plurality of resonators, wherein
the radiating element and the resonance circuit constitute a filter device,
the resonance circuit includes
an input line that receives a radio frequency signal,
a first resonance portion that is coupled with the input line and functions as an extracted pole unit (EPU), the EPU generating an attenuation pole in an outside of a pass band of the filter device, and
a second resonance portion that is coupled with the input line and the radiating element, wherein
the antenna module further includes a second ground electrode that is arranged between the radiating element and the input line,
the input line is arranged between the first resonance portion and the second resonance portion, and
in plan view in a normal direction of the dielectric substrate,
part of the first resonance portion overlaps with the input line, and
part of the second resonance portion overlaps with the input line.

2. The antenna module according to claim 1, wherein
the first resonance portion includes a first resonator and a second resonator, the first resonator and the second resonator being arranged adjacent to each other,
the second resonance portion includes a third resonator and a fourth resonator, the third resonator and the fourth resonator being arranged adjacent to each other,
the second resonator and the third resonator are coupled with the input line, and
the fourth resonator is coupled with the radiating element.

3. The antenna module according to claim 2, wherein
when a direction from the first ground electrode toward the radiating element in the dielectric substrate is defined as a first direction,
the first resonance portion is arranged at a position between the input line and the first ground electrode in the first direction, and
the second resonance portion is arranged at a position between the radiating element and the input line in the first direction.

4. The antenna module according to claim 2, wherein
when a direction from the first ground electrode toward the radiating element in the dielectric substrate is defined as a first direction,
the input line, the first resonance portion, and the second resonance portion are arranged adjacent to each other at a same distance from the first ground electrode in the first direction, and
the input line is arranged between the first resonance portion and the second resonance portion when the dielectric substrate is viewed in plan in the first direction.

5. The antenna module according to claim 4, wherein
the resonance circuit further includes a first adjustment element that is coupled with the input line and the second resonator and adjusts a coupling amount between the input line and the second resonator.

6. The antenna module according to claim 5, wherein
the resonance circuit further includes a second adjustment element that is coupled with the input line and the third resonator and adjusts a coupling amount between the input line and the third resonator.

7. The antenna module according to claim 6, wherein
the resonance circuit further includes a third adjustment element that is coupled with the first resonator and the second resonator and adjusts a coupling amount between the first resonator and the second resonator.

8. The antenna module according to claim 7, wherein
when a wavelength of a signal corresponding to a center frequency of a pass band of the filter device is denoted as $\lambda$, each of the first resonator, the second resonator, the third resonator, and the fourth resonator is a $\lambda/4$ resonator of which one end is connected to the first ground electrode.

9. The antenna module according to claim 8, wherein
the fourth resonator and the radiating element are coupled with each other in a non-contact manner.

10. The antenna module according to claim 9, wherein
the fourth resonator includes a first flat-plate electrode and a second flat-plate electrode that are arranged to be opposed to each other, and a first via that connects the first flat-plate electrode and the second flat-plate electrode with each other.

11. The antenna module according to claim 8, further comprising:

a second via that is connected with the fourth resonator and the radiating element.

12. The antenna module according to claim 11, wherein the resonance circuit further includes a plurality of third vias that are arranged to surround the input line, the first resonance portion, and the second resonance portion in plan view in a normal direction of the dielectric substrate and are connected to the first ground electrode.

13. The antenna module according to claim 1, wherein the resonance circuit further includes a third an adjustment element that is coupled with the first resonator and the second resonator and adjusts a coupling amount between the first resonator and the second resonator.

14. The antenna module according to claim 1, wherein the resonance circuit further includes a plurality of third vias that are arranged to surround the input line, the first resonance portion, and the second resonance portion in plan view in a normal direction of the dielectric substrate and are connected to the first ground electrode.

15. The antenna module according to claim 4, wherein the resonance circuit further includes a second adjustment element that is coupled with the input line and the third resonator and adjusts a coupling amount between the input line and the third resonator.

16. The antenna module according to claim 1, further comprising:

a feed circuit that feeds the radio frequency signal to the input line.

17. A communication device on which the antenna module according to claim 1 is mounted.

18. An antenna module comprising:

a dielectric substrate;

a radiating element that is arranged in the dielectric substrate;

a first ground electrode that is arranged to be opposed to the radiating element; and a first resonance circuit and a second resonance circuit each of which is arranged between the radiating element and the first ground electrode and includes a plurality of resonators, wherein the radiating element and the first resonance circuit constitute a first filter device and the radiating element and the second resonance circuit constitute a second filter device, each of the first resonance circuit and the second resonance circuit includes an input line that receives a radio frequency signal, a first resonance portion that is coupled with the input line and functions as an EPU, the EPU generating an attenuation pole in an outside of a pass band of a corresponding filter device, and a second resonance portion that is coupled with the input line and the radiating element, wherein the input line is arranged between the first resonance portion and the second resonance portion, the antenna module further includes a second ground electrode that is arranged between the radiating element and the input line of the first resonance circuit and between the radiating element and the input line of the second resonance circuit, the radiating element is capable of radiating a radio wave in a first polarization direction and a second polarization direction, the second polarization direction being different from the first polarization direction, a signal passing through the first resonance circuit is supplied to a feed point for radiating a radio wave of the first polarization direction in the radiating element, a signal passing through the second resonance circuit is supplied to a feed point for radiating a radio wave of the second polarization direction in the radiating element, and in plan view in a normal direction of the dielectric substrate, part of the first resonance portion overlaps with the input line, and part of the second resonance portion overlaps with the input line.

19. The antenna module according to claim 18, further comprising:

a feed circuit that feeds the radio frequency signal to the input line.

20. A communication device on which the antenna module according to claim 19 is mounted.

* * * * *